United States Patent [19]

Maher

[11] Patent Number: 4,568,384

[45] Date of Patent: Feb. 4, 1986

[54] METHOD FOR MAKING AG/PD ELECTRODING POWDER

[75] Inventor: Galeb H. Maher, North Adams, Mass.

[73] Assignee: Sprague Electric Company, North Adams, Mass.

[21] Appl. No.: 692,480

[22] Filed: Jan. 18, 1985

Related U.S. Application Data

[62] Division of Ser. No. 493,863, May 12, 1983, Pat. No. 4,500,368.

[51] Int. Cl.$^4$ ............................ H01G 7/00; B22F 1/00
[52] U.S. Cl. ............................. 75/0.5 R; 419/31; 29/25.42; 75/0.5 B; 148/126
[58] Field of Search ............... 75/0.5 B, 0.5 R; 148/6, 148/6.3, 126; 427/126.3, 212, 216, 79; 419/31; 29/25.41, 25.42

[56] References Cited

U.S. PATENT DOCUMENTS 4,324,750  4/1982  Maher ................................. 264/61

*Primary Examiner*—Christopher W. Brody

[57] ABSTRACT

Pure silver and palladium powders are thoroughly mixed and dispersed by ball milling in a solution of a surfactant in a liquid vehicle. After drying and granulating, the resulting powder was heated to 500° C., first to form an Ag/Pd alloy powder and then to cause palladium to precipitate from the interior of the alloy particles, to form a protective barrier of PdO on the alloy particle surfaces and to alter the alloy to 90Ag/10Pd. This powder, when used to make a buried electrode in a ceramic capacitor changes dimensions very little up to 500° C. in the early stage of sintering the ceramic below which temperature the ceramic is weakest and most subject to cleaving.

9 Claims, 21 Drawing Figures

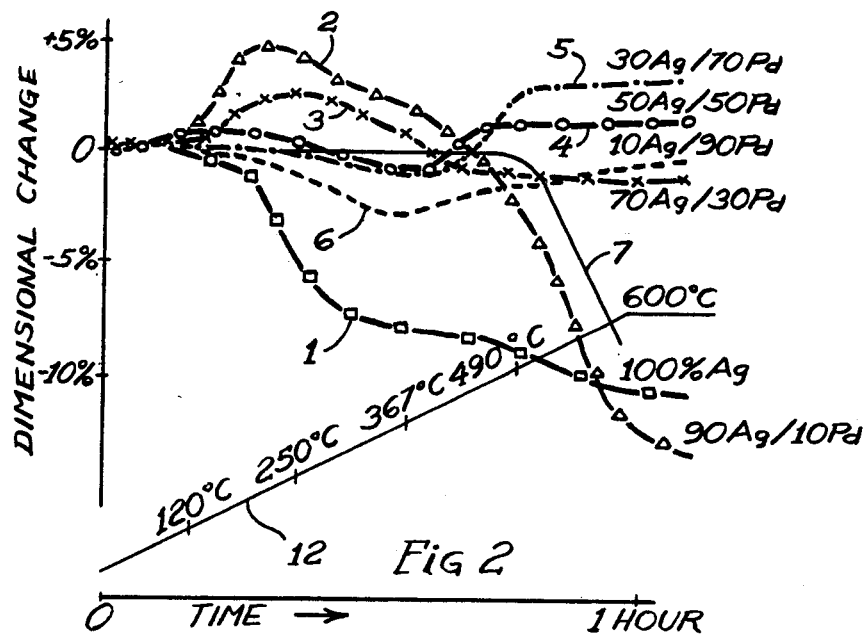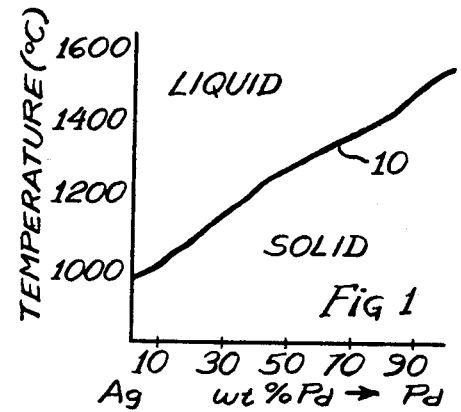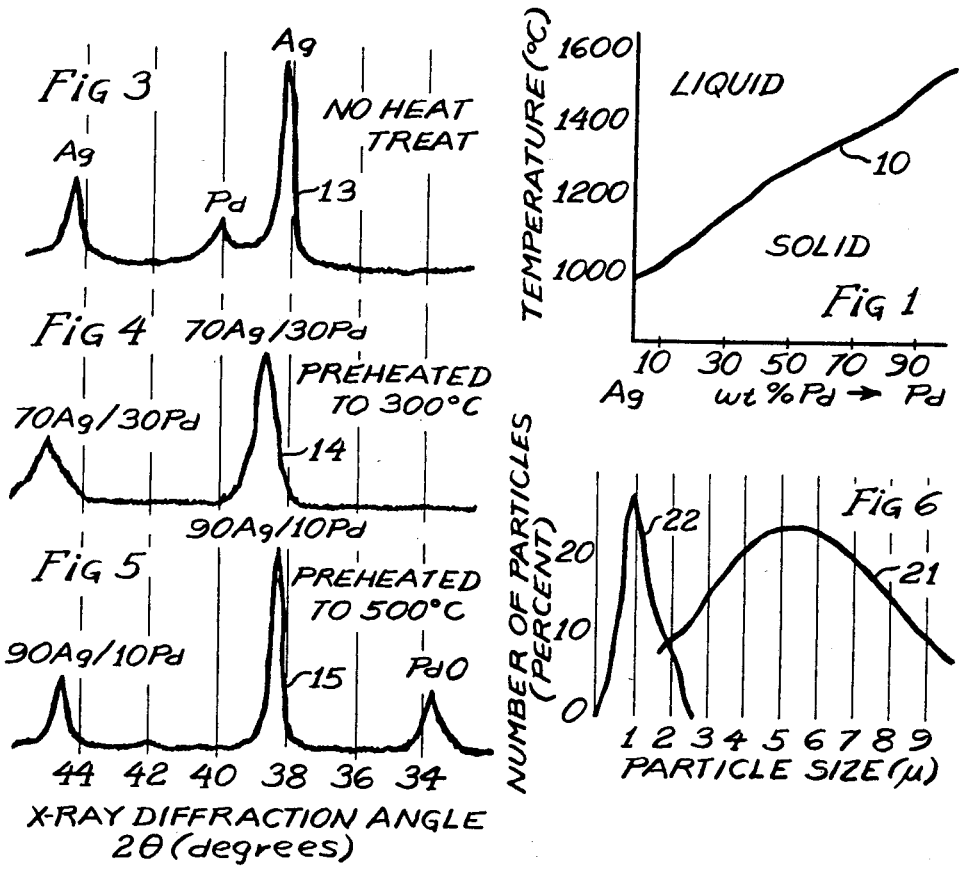

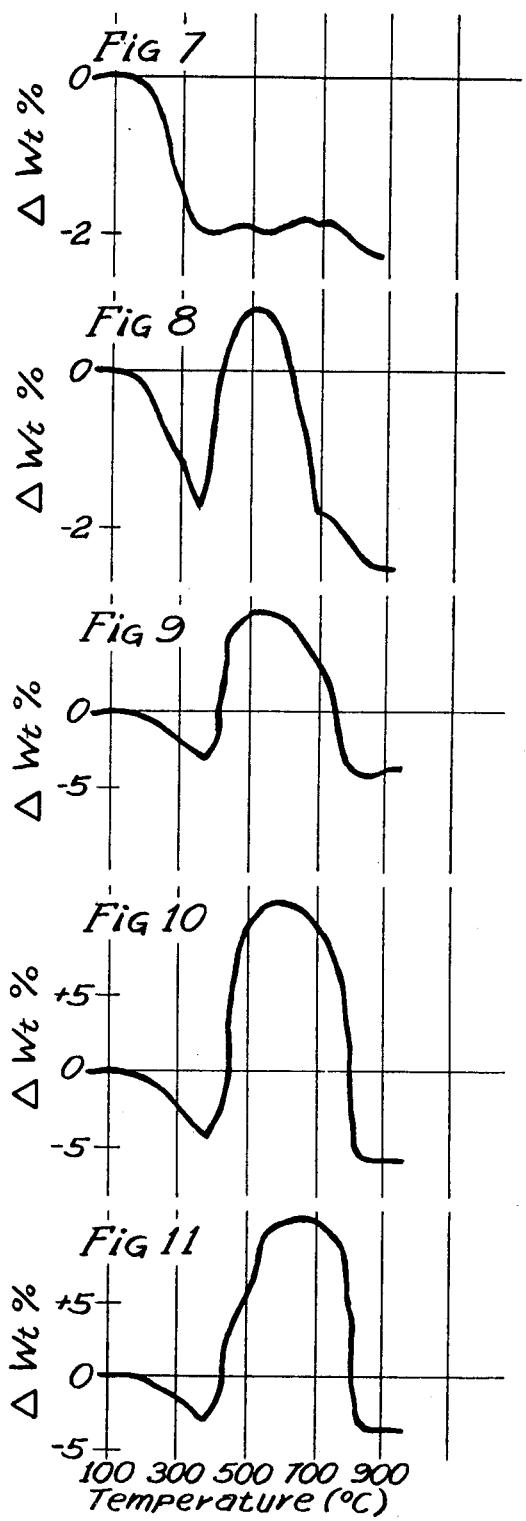

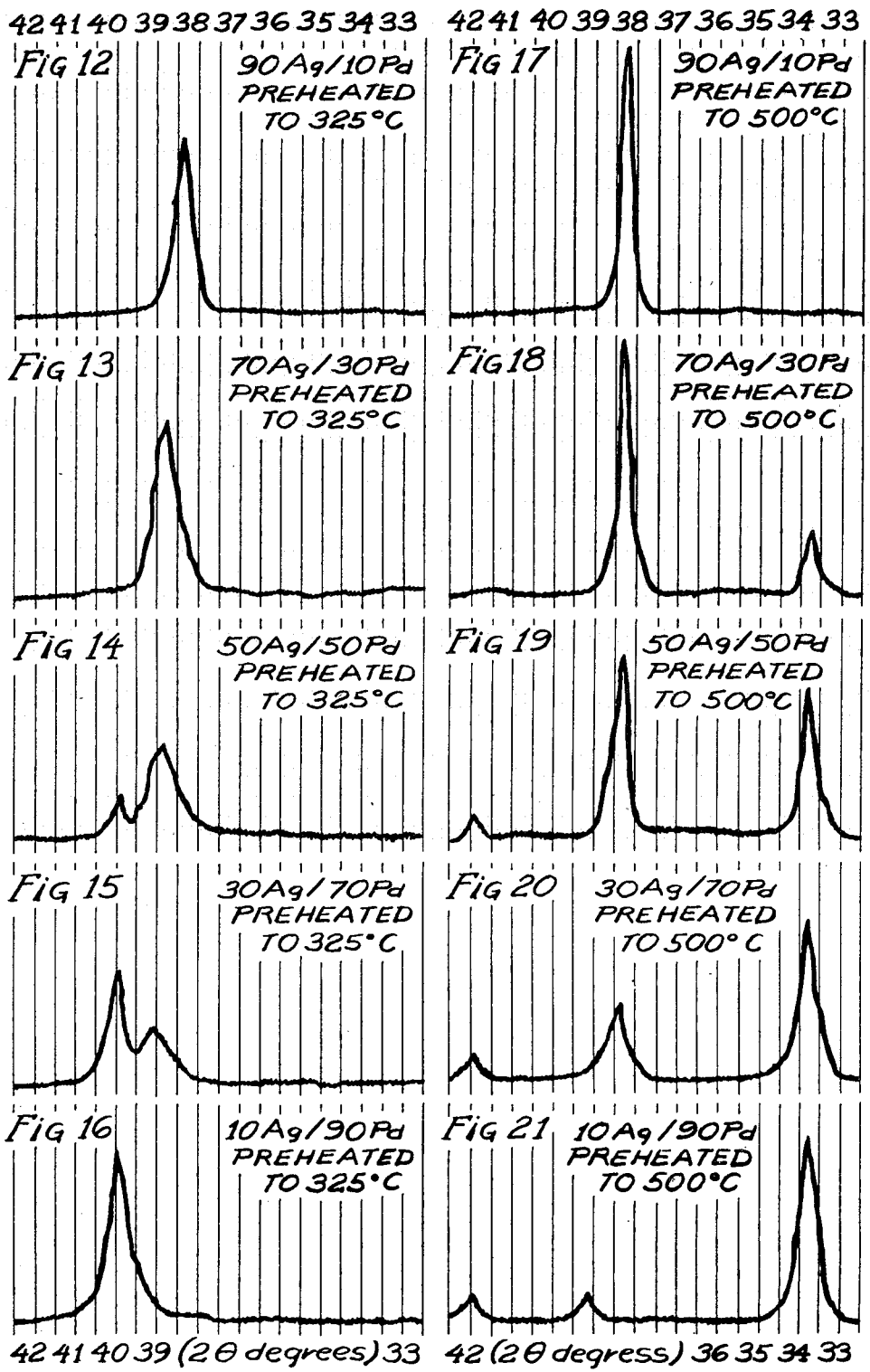

METHOD FOR MAKING AG/PD ELECTRODING POWDER

CROSS REFERENCE TO RELATED APPLICATION

This application is a division of application Ser. No. 493,863 filed May 12, 1983, now U.S. Pat. No. 4,500,368.

BACKGROUND OF THE INVENTION

This invention relates to a silver and palladium powder for use in forming the buried electrodes in a monolithic ceramic capacitor by a standard ceramic/electrodes co-firing step.

The ceramic formulations used in early monolithic capacitors and even in some present day capacitors must be fired at a high temperature, typically 1400° C., to achieve a full sintering and densification. Such capacitors include an all-noble-metal buried electrode such as pure palladium that does not lose conductivity through oxidation and that has a melting temperature (1550° C.) greater than the above-noted high temperature at which the ceramic could be sintered to maturity. Lower melting metals would simply flow out of the ceramic during sintering. High melting base metals, such as iron could not be used because they would oxidize and become nonconductive in the oxygen firing atmosphere usually required to avoid reducing the ceramic. Furthermore, such metal oxides tend to diffuse into the adjacent ceramic degrading the electrical characteristics of that dielectric.

In the monolithic ceramic capacitor industry today, there is a pronounced move toward the use of lower-firing ceramic compositions that may include a sintering aid or flux, usually a glass. The glass first melts and sintering of the ceramic takes place by the simultaneous process of dissolution and recrystallization. This is known as liquid phase sintering, as is described in my patent U.S. Pat. No. 4,266,265, issued May 5, 1981, and assigned to the same assignee as is the present invention. Most such flux containing commercial capacitors are now sintered at below 1200° C. and include a silver-palladium alloy electrode, typically 70 Ag/30 Pd by weight and having a solidous temperature of 1160° C. Other ceramic compositions without fluxes sinter at such low temperatures, e.g. as described in my patent, U.S. Pat. No. 4,324,750 issued Apr. 13, 1982 and also assigned to the same assignee. These may also employ Ag/Pd alloy electrodes. A great savings is thereby realized through lower energy costs and lower metal costs. The temperatures at which the various silver-palladium alloys are always solid lie below the solidus curve 10 of FIG. 1.

A typical process for making such medium-firing monolithic ceramic capacitors includes mixing very fine silver and palladium metal powders (e.g. produced by a precipitation process) in an organic vehicle to form an electroding ink, forming a multiplicity of thin layers of green fluxed-ceramic, depositing a film of the silver-palladium ink on each of the green ceramic layers, stacking the inked ceramic layers and firing the stack to mature the ceramic and to alloy and sinter the electrode. Coarser silver powders are cheaper, are more readily available and are used in capacitors that have thick (e.g. 2 mils or 51 mm) ceramic layers between adjacent electrodes, in which case a lack of uniformity of the electrode surfaces is not so detrimental to capacitor quality.

There is a trend in the industry toward thinner dielectric layers to increase the amount of electrical capacitance that can be got in a monolithic ceramic body of a given size. This requires smoother electrodes that will not randomly intrude into the thin dielectric layer and create points of low breakdown strength.

In any case, however, it often occurs at firing that a significant fraction of a production lot of capacitors is subject to cleaving that is usually a "delamination" at an interface between an electrode and the ceramic. This leads to a degradation in electrical properties of the capacitor, such as loss of capacity, and shorter life. Such cleaving and degradation becomes more severe as the thickness of the active dielectric layers becomes smaller.

It is an object of this invention to provide silver and palladium containing powders that may be used in electroding inks for making medium-firing monolithic ceramic capacitor bodies to provide more rugged capacitor bodies that do not delaminate or cleave in any fashion.

It is a further object of this invention to provide a method for making such capacitors that have thin dielectric layers and uniformly smooth buried electrodes.

SUMMARY OF THE INVENTION

This invention recognizes that delamination in monolithic ceramic capacitors is frequently due to the changing dimensions of the buried electrodes in the early low temperature stage of the ceramic-sintering step after the organic binder in the ceramic is burned off and before the ceramic body itself regains strength through sintering.

The metal electroding powder of this invention is comprised of silver palladium alloy particles having a composition by weight of 90 Ag/10 Pd and a fine palladium oxide formed at the surfaces of the alloy particles. The palladium oxide is at the interfaces of all adjacent alloy particles and has the effect of elevating the temperature at which the alloy will sinter and shrink.

In the method for making such an electroding powder, an Ag/Pd alloy powder of less than 90% by weight, silver is heated at about 500° C. to oxidize a portion of the palladium from the alloy used to form a fine palladium oxide at the surfaces of the alloy particles. The term "alloy" as used herein means a solid solution. This step has been shown to cause oxidation of all of the palladium from the alloy except enough to leave the more silver-rich alloy composition 90 Ag/10 Pd. The 90 Ag/10 Pd alloy has been found to be a very stable solid solution that resists further oxidation.

When an electroding powder of this invention is substituted for a conventional Ag/Pd powder mixture in a conventional process for making monolithic ceramic capacitors, negligible dimensional changes occur at sintering in the buried electrodes up to about 500° above which the ceramic body itself begins to sinter and to regain strength. The result is essentially a zero incidence of cleaving and delaminating.

The two phase powder of this invention has several distinct advantages over a simple combination of alloy powder and palladium oxide powder. Since in the powder of this invention, each alloy particle has on its surface an intimately associated quantity of palladium oxide, it is hard to conceive of a more perfectly dispersed two phase system. This insures that, during the co-firing of the electrode and ceramic of a monolithic ceramic capacitor, there will be no isolated alloy particles to sinter and shrink at the early lower temperatures when the green ceramic cake is weakest, namely at less than 500° C.

During the metal powder preheating step in a preferred capacitor making process of this invention, silver particles diffuse into and alloy with neighboring palladium particles rather than vice versa because diffusion rates of silver into palladium are much greater than for palladium into silver. So it is possible to use as start materials the easily obtainable submicron-particle-size palladium powder (e.g. 6 to 12 $M^2$/gm) with the also easily obtainable large-particle-size silver powder (e.g. silver powder having a surface area less than 4 $M^2$/gm) Fine silver particles are difficult and expensive to obtain. The process thus has the advantage of being tolerant of the start-silver-powder particle size.

Furthermore, photo micrographs taken with the scanning electron microscope seem to reveal the breaking up of large alloy particles, greater than one micron, into finer ones owing to the precipitation of PdO along the alloy habit plains and grain boundaries, and owing to the mismatch between the unit cell sizes of PdO and the Ag/Pd alloy, respectively. Whatever the mechanism may be, after mechanically deagglommerating the preheated powder, it is found to have a very narrow distribution of particle sizes at about one micron. A substantial portion of the start silver particles are much larger. This feature leads to the formation of exceptionally smooth capacitor electrodes that in turn leads to higher capacitor breakdown voltages.

BRIEF DESCRIPTION OF THE DRAWINGS

FIG. 1 shows a standard solidous curve for the alloys of silver and palladium.

FIG. 2 shows a plot of the expansion and contraction of pelleted powders of a series of Ag and Pd metals and alloys thereof and including powder of 90 Ag/10 Pd alloy particles of this invention with Pdo surfaces.

FIG. 3 shows an X-ray diffraction chart of a mixture of pure silver powder with pure palladium powder.

FIG. 4 shows the X-ray diffraction chart of the powder mixture of FIG. 3 but after a heat treatment up to 300° C.

FIG. 5 shows an X-ray diffraction chart of the powder mixture of FIG. 3 but after a further heating at 500° C., representing a powder of this invention.

FIG. 6 shows a powder particles population graph as a function of particle sizes for the material represented in FIG. 5.

FIGS. 7 through 11 are TGA graphs plotting weight changes with temperature of five Ag/Pd alloys, respectively.

FIGS. 12 through 16 show X-ray diffraction charts of the above noted five Ag/Pd alloys after a preheating at 325° C.

FIGS. 17 through 21 show X-ray diffraction charts of the above-noted five Ag/Pd alloys after a further heat treatment at 500° C., as called for in the method of this invention.

DESCRIPTION OF THE PREFERRED EMBODIMENTS

Experiment 1

A series of six blends of silver powder having a characteristic surface area of 3.4 $M^2$/gm, and palladium powder having a characteristic surface area of 11.15 $M^2$/gm, were each formed by the following process with exceptions to be noted.

A slurry was formed by adding 30 gms of metal powder to a solution of 13 gm terpineol, 3.75 gm lecethin and 3.75 gm Quaternary-O (a Tradename of Geigy Industrial Chemicals, Ardsley, NY). The latter two ingredients are cationic surfactants (dispersants) that advantageously do not disintegrate below 350° C. The slurry was milled in a polyethylene bottle with high purity alumina beads for 2 hours and then dried at 150° C. for 2 hours. The dried blend was then passed through a 20 mesh seive to remove the milling beads. The metal constituents of each powder blend is given in Table I.

TABLE I

| Blend | % Ag | % Pd |
|---|---|---|
| 1 | 100 | 0 |
| 2 | 90 | 10 |
| 3 | 70 | 30 |
| 4 | 50 | 50 |
| 5 | 30 | 70 |
| 6 | 10 | 90 |

In exception to the process described above, a larger amount, namely 4.35 gm, of each surfactant was added to the slurry to better disperse the more palladium rich blends 5 and 6.

Tests were then made to determine the dimensional changes of these powders with temperature. Half gram pellets of each were made by pressing the powder in a mold of 0.250 inch (6.4 mm) diameter and 0.150 inch (3.8 mm) height to about 50% of theoretical density. A measurement by dilatometer was made of the expansion and shrinkage of each pellet during heating as indicated by curve 12 in FIG. 2. These dimensional changes in percent were plotted in FIG. 2, curves 1 through 6 corresponding to blends 1 through 6 in the table, respectively.

In each of the curves 2 through 6, the first expansion corresponds to the alloying of palladium and silver. For example, this expansion occurs in the range from 120° C. to 220° C. for the composition 90 Ag/10 Pd. It should be noted that much greater expansion will occur when the start metals are poorly dispersed. This is caused by oxidation of undispersed palladium. What is needed is 100% Ag particle to Pd particle contact for optimum dispersal. Good dispersal requires the use of a surfactant.

In a capacitor, the expansion of the electrode occurring at electrode alloying contributes to a tendency to delaminate since it occurs well within the temperature range below 500° C. wherein the ceramic is weakest. Furthermore, if the above noted dispersion of silver and palladium powders was not complete, expansion of the electrode beginning at about 350° C. may be partly due to the oxidation of un-alloyed free palladium. Electrode metal shrinkage due to sintering of the metal particles, as indicated by negative slope portions of the curves in FIG. 2, is also by the same reasoning, a source of cleavage and delamination. Oxidation and precipitation of PdO from an Ag/Pd alloy causes little dimensional change but the oxidation of free particles of pure palladium (that in a system of this invention did not get properly dispersed) has a high expansion associated with it.

Experiment 2

Some of the pellets made from blend 3 material, that had not been heated, were heated to 500° C. for 2½ hours and cooled. These pellets were then heated at the rate of 10° C./minute while being monitored by the dilatometer for dimensional changes. The result is curve 7 in FIG. 2 wherein there was less than 1% expansion up to 500° C. after which shrinkage occurs due to reduction of the PdO, realloying of the reduced palladium, and immediate sintering of the alloy particles that are no longer prevented from sintering by a PdO barrier.

Thus the heat treated electroding powder of this invention avoids expanding and exhibits a delayed shringage at a temperature over 500° C. at which the ceramic is gaining strength. It is preferably comminuted again by ball milling or by fluid milling (jet pulverizing) prior to being used for an electroding paste. Such comminuting should provide a powder having a surface area within the range 0.5 to 5.0 $M^2$/gm.

Experiment 3

Pure palladium powder with a surface area of about 12 $M^2$/gm completely oxidized at 575° C. and remained stable to 790° C. At 790° C. the PdO begins to reduce (the heating being in air) and only pure palladium is left after reaching 880° C. For palladium powders of smaller area (larger particle sizes) temperatures above 575° C. are required to completely oxidize the metal but stable oxide, PdO, is still observed to 790° C. and complete reduction is realized at 880° C. and higher.

Experiment 4

A mixture of 70% silver and 30% palladium powders (by weight) was dispersed in a water solution having relative to the metal 1½ weight percent of the cationic surfactant, Quaternary-O. The slurry was milled with alumina for 2 hours to obtain thorough mixing. It was then dried at 150° C. and passed through a 200 mesh screen. A major portion of the screened powder mixture was heated to 300° C. for 2½ hours. Half of that material was removed and cooled while the remainder was heated further to 500° C. for 2½ hours.

Thus there were three batches of powder, (A) an unheated silver/palladium mixture, (B) a silver-palladium (solid solution) alloy powder heated to 300° C., and (C) a silver-palladium alloy powder heated to 500° C. Each batch was milled in terpineol as a vehicle and lecithin as a surfactant for 8 hours. Relative to the metal, the terpineol amounted to 47.5 wt % and the lecithin 2.5 wt %. The milling step is to break up particle agglomerations. After milling, the vehicle and lecithin dispersant (surfactant) can advantageously serve as principal rheological elements of the electroding ink.

X-ray diffraction traces 13, 14 and 15 of the three powders are illustrated in FIGS. 3, 4 and 5 corresponding to powders A, B and C, respectively. The trace 13 shows characteristic X-ray diffraction peaks for pure silver and pure palladium. The trace 14 shows characteristic diffraction peaks for the solid solution 70 wt % silver and 30 wt % palladium. Note that there is no free silver, free palladium or palladium oxide.

Any PdO that might be formed at below 300° C. is the result of oxidation directly from the metal and not from the alloy particles. This suggest a good test for adequate dispersion of the start silver and palladium powders. One would heat a sample of the pelletized mixture to about 275° C. and then determine whether PdO is present (e.g. by X-ray diffraction) or whether during the heating oxidation occurred (e.g. by T.G.A.).

The trace 15 shows characteristic peaks for palladium oxide (PdO) as well as for an alloy of composition 90 wt % silver and 10 wt % palladium (as closely as could be determined by the X-ray diffraction measurement). Note the shift in the diffraction peaks in the solid solution. These and other results indicate that the formation of a precipitated palladium oxide on the surface of the 90 Ag/10 Pd alloy particles is responsible for the shifting and delaying of the metal shrinkage to the higher range of temperatures noted in FIG. 2.

It should further be noted that when less than perfect dispersion of the palladium and silver is accomplished, the process of this invention may still provide electroding pastes that have less tendency to cause cleavage and delamination in a capacitor than do electroding pastes of the prior art. The "free" palladium (not properly dispersed) will oxidize and expand at about 300°–500° C., depending on particle size. However, if free palladium is a small part (less than about 20% by weight of the remaining metal) enough palladium will have alloyed and precipitated as a thin film of protective palladium oxide over the 90 Ag/10 Pd alloy particles to prevent cleaving and cracking.

Experiment 5

Using a silver powder having a surface area of 2 $M^2$/gm and a palladium powder with surface area of 10 $M^2$/gm, an electroding powder was prepared by the same method as was powder batch C (preheated to 500° C.) in example 4. The surface area characterizing the heat treated powder, as determined by a standard gas monosorb surface area measurements, yielded 0.75 $M^2$/gm (corresponding to an equivalent spherical particle diameter of 0.70 micron). This material was milled for 8 hours in terpineol and lecithin. Particle size distribution curves 21 and 22 are plotted in FIG. 6, corresponding to the heat-treated powder and to the heat-treated and milled powder, respectively. The powder after milling has a very narrow distribution, almost mono-disperse. This surprising but welcome result is an inherent feature of the powder producing method of this invention.

Experiment 6

Another group of test pellets were formed containing metal blends 2 through 6 as described in Experiment 1 and Table I. Each one of these not-yet heat-treated pellets were then ramp heated, in turn, in a thermogravinometric analyzer (TGA) to determine weight change as a function of temperature. Such a test reveals when organic vehicles and binders are burned off and when oxidation or reduction occurs. TGA curves are shown in FIGS. 7 through 11 of pellets made of blends 2 through 6, respectively.

Experiment 7

Another group of slurries were formed containing metal blends 2 through 6 as described in Experiment 1 and Table I. These slurries had been dried at 150° C. and screened but not yet heat-treated.

Each group of powder material was heated to 325° C. for half an hour and cooled. Then each group was subjected to X-ray diffraction analysis. The most prominent peaks in the Ag-Pd system are found in the diffraction plane.

In the X-ray diffraction charts of FIGS. 12 through 16 are seen the compositions of the mildly (325° C.) preheated compositions derived from blends 2 through 6, respectively. The characteristic "X-ray diffraction angle", given in terms of $2\theta$, is provided in Table II for frequently occurring peaks.

TABLE II

| Composition | X-ray diffraction angle, $2\theta$ |
|---|---|
| Pd | 40.1°** |
| 70 Ag/30 Pd* | 38.75°** |
| 90 Ag/10 Pd* | 38.35°** |
| Ag | 38.15°** |
| PdO | 33.8°*** |

*solid solution (alloy)
**angles for 111 diffraction plane
***angle for 101 diffraction plane Experiment 8

The preheated groups of powder of Experiment 7 were further heated for half an hour at 500° C. Each powder group was then resubjected to X-ray diffraction analysis.

The X-ray diffraction charts of FIGS. 17 through 21 are seen in the fully heat-treated compositions derived from blends 2 through 6, respectively.

These experiments strongly indicate that oxygen diffuses into the grains of the Ag/Pd alloy, oxidizing the palladium when the start alloy has more than 10% Pd. PdO is then precipitated from the interior to the surfaces of the grains. Confirmation that precipitation of PdO from an Ag/Pd alloy occurs at all is found in the facts that after heating such alloys to 500° C., X-ray diffraction measurements show strong PdO peaks while at the same time the diffraction peak of the alloy has shifted down to about 90 Ag/10 Pd alloy. Also supporting PdO precipitation is the fact that the unit cell size for 70 Ag/30 Pd (65 Å$^3$) and that for PdO (49 Å$^3$) are so disparate. The transient existence of a layer of precipitated PdO molecules over the surfaces of the silver rich silver-palladium-alloy particles is indicated as being responsible for the long delay of sintering of the Ag/Pd alloy particles.

Thus in one method of this invention, pure palladium and pure silver powders are very thoroughly dispersed and pre-heated in air to about 500° C. Alloying occurs first. Oxygen diffuses into the alloy grains. Then some of the palladium oxidizes and the palladium oxide precipitates over the surfaces of the alloy grains preventing sintering. The result is a powder having a PdO phase and a 90 Ag/10 Pd alloy phase. When this preheated powder is used in an electroding paste in a monolithic ceramic capacitor it exhibits little dimensional changes (see curve 7 in FIG. 2) during the firing of the ceramic up to 500° C. when a green ceramic is weakest. Up to that temperature, the dimensions of a green ceramic typically changes 0.2%. The ceramic begins to sinter above about 500° C., and the ceramic bodies begin to gain strength at that point in the ceramic sintering process.

The experimental evidence also suggest that for the more silver rich alloys than 90 Ag/10 Pd, it becomes very difficult if not impossible to effect the oxidation of the palladium and the subsequent precipitation of PdO on the alloy crystal surfaces. In fact the 90 Ag/10 Pd composition appears to be an especially stable alloy that may itself prove advantageous as a buried electrode in a very low temperature sintering ceramic capacitor, or as a printed conductor or capacitor termination wherein silver migration is expected to be greatly retarded, compared with pure silver.

In the above noted powder heat treating step (pre-heating to 500° C.), pure silver and pure palladium particles first alloyed before the occurrence of oxidation etc. Thus electroding powders of this invention may be prepared by heating a single-phase Ag/Pd alloy (solid solution) powder to about 500° C.

Therefore it is possible to produce a PdO-coated-70 Ag/30 Pd alloy powder of this invention using as start materials, a single alloy 70 Ag/30 Pd powder; or mixtures of Ag/Pd alloys, e.g. 95 Ag/5 Pd mixed with 20 Ag/80 Pd; or a mixture of either silver or palladium powder with an alloy powder, e.g. 85 Ag/15 Pd with palladium powder. By properly adjusting the amounts of each start ingredient in the above start mixtures, the composition of the finally sintered capacitor electrode may be determined. However, it is preferred to employ a start mixture of pure palladium powder with pure silver powder since they are by far the most easily obtained and cost the least. And silver powder of surface area less than 6 M$^2$/gm and more particularly 2 M$^2$/gm is especially economical.

It is preferred that the ratio by weight of silver to palladium in the start materials (of the electroding powder produced by the method of this invention) is between 30 Ag/70 Pd to 90 Ag/10 Pd because this alloy range is of greatest use today and because for these alloys the invention clearly provides the greatest benefit.

What is claimed is:

1. A method for making a metal electroding powder for use in making monolithic ceramic capacitors comprising heating in air at about 500° C. a powder made up of particles of a silver-palladium alloy of less than 90% by weight silver to oxidize a portion of said palladium from said alloy to form a fine palladium oxide at the surfaces of said particles and to render said alloy more silver rich and having a composition of 90 Ag/10 Pd by weight.

2. The method of claim 1 additionally comprising mixing said oxidized alloy powder with a liquid organic vehicle to form an electroding paste.

3. The method of claim 1 additionally comprising prior to said heating:
   mixing a silver powder with a palladium powder and thoroughly dispersing said two metal powders to form a homogenous two-metal-powder mixture; and
   preheating said mixture up to about 300° C. to form said silver-palladium alloy powder.

4. The method of claim 3 wherein the surface area of said silver powder is substantially less than that of said palladium powder.

5. The method of claim 4 wherein the surface area of said silver powder is less than 6 M$^2$/gm and the surface area of said palladium powder is between 8 and 12 M$^2$/gm.

6. The method of claim 5 additionally comprising comminuting said alloyed powder after said further heating until the powder surface area is from 0.5 to 5.0 M$^2$/gm.

7. The method of claim 3 wherein said dispersing is accomplished by milling said silver and palladium powders in a liquid vehicle containing a dissolved cationic dispersant that begins to disintegrate at above 350° C.

8. The method of claim 3 wherein the ratio by weight of said silver powder to said palladium powder is between 30/70 to 90/10.

9. A method for making a monolithic ceramic capacitor comprising:
(a) making an electroding powder by heating in air a silver-palladium alloy powder of less than 90% by weight silver at about 500° C. to oxidize a portion of said palladium to form a fine palladium oxide at the surfaces of the particles of said alloy powder and to render said alloy more silver rich and having a composition of about 90 Ag/10 Pd by weight;
(b) forming a plurality of layers of a green ceramic composition comprising a mixture of a high-firing-temperature ceramic powder and a low-melting-temperature sintering flux;
(c) depositing a layer of said heated silver-palladium powder on each of said green ceramic layers;
(d) stacking said green ceramic layers to form a green monolithic ceramic capacitor body; and
(e) sintering said green ceramic body at less than 1200° C.

* * * * *